(No Model.) 2 Sheets—Sheet 1.
H. CHENAULT.
DEVICE FOR RELIEVING ANIMALS FROM FLIES.
No. 562,758. Patented June 23, 1896.
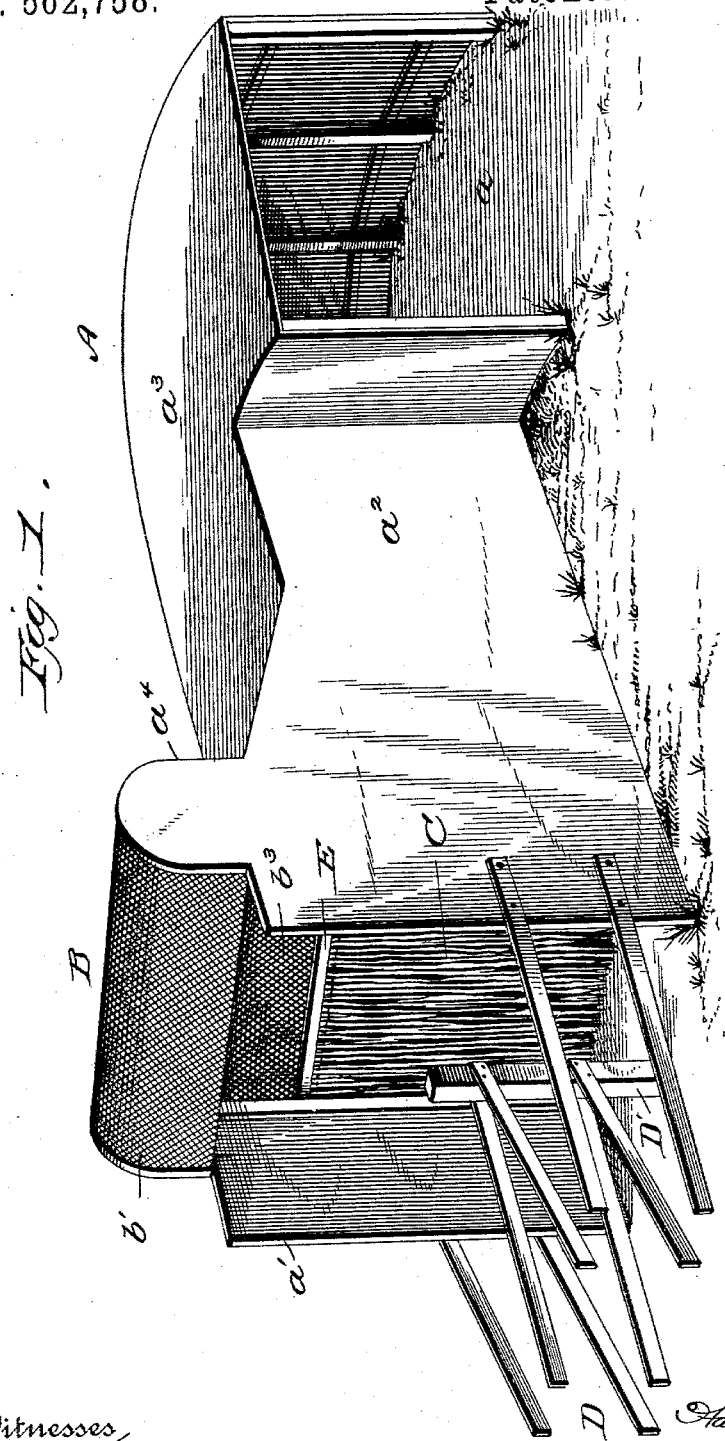
Witnesses
Inventor
Harvey Chenault,
by F. F. Davis,
His Attorney

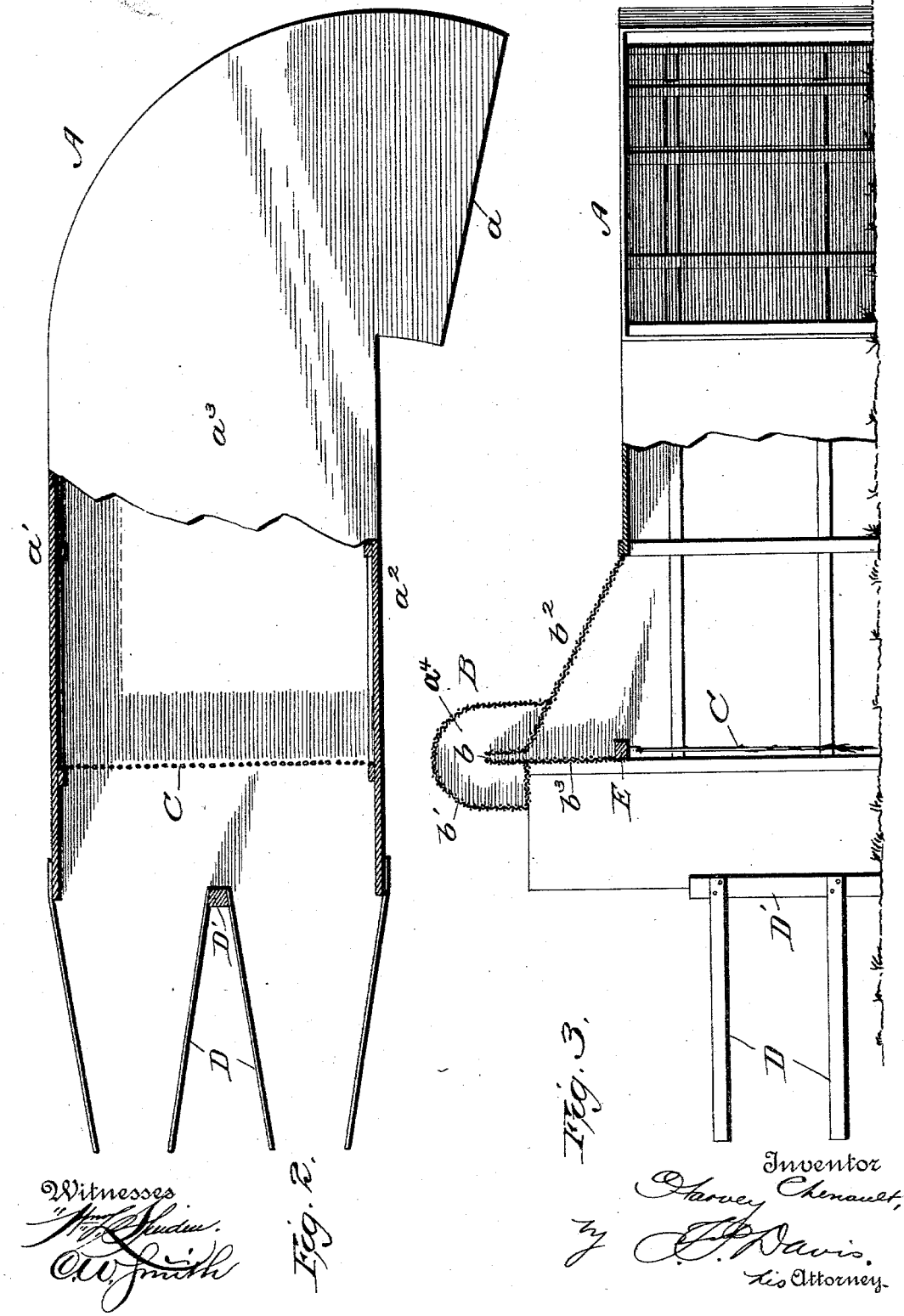

UNITED STATES PATENT OFFICE.

HARVEY CHENAULT, OF RICHMOND, KENTUCKY.

DEVICE FOR RELIEVING ANIMALS FROM FLIES.

SPECIFICATION forming part of Letters Patent No. 562,758, dated June 23, 1896.

Application filed March 5, 1896. Serial No. 581,947. (No model.)

*To all whom it may concern:*

Be it known that I, HARVEY CHENAULT, a citizen of the United States, residing at Richmond, in the county of Madison and State of Kentucky, have invented a new and useful Device for Relieving Animals of Flies, of which the following is a specification.

My invention relates to a device for frightening flies from domestic animals, particularly cattle, and then catching them, so that they cannot again annoy the animals.

Cattle-raisers in many of the Southern and Western States experience annually great losses owing to the swarms of flies which worry the cattle so constantly that they fatten very slowly because of their efforts to brush off the flies and their exercise in trying to avoid them by running through bushes, &c. So troublesome have the flies become in many localities in recent years that the cattle-raisers have seriously considered giving up their business on account of the great expense necessary to fatten the cattle for market.

The object of my invention is to provide a device for destroying cattle-flies which will, to a large extent at least, remove the above evil.

My invention comprises, in general, first, a closed passage-way with a frightening device located across one end, and, second, a closed passage-way with a frightening device located at one end and a trap adjacent thereto.

My invention further comprises certain details of construction more fully hereinafter set forth.

In the accompanying drawings, which illustrate my inventions, Figure 1 represents a perspective view of my complete device; Fig. 2, a plan view, the left half being in horizontal section; and Fig. 3, a vertical sectional view, the right end being in elevation.

Similar letters refer to similar parts throughout the several views.

A designates a closed passage-way of such height and width as to permit cattle to pass therethrough. The entrance $a$ of such passage-way is located in an offset portion out of alinement with the main passage for a purpose hereinafter described. This passage-way A is made of any suitable material, preferably wooden planks arranged close together, forming substantially vertical side walls $a'$ $a^2$, the tops of which support the roof $a^3$. The roof $a^3$ extends over the side walls for about two-thirds of their length. At the termination of the roof the side walls incline upwardly and then form vertically-projecting portions $a^4$, having curved upper edges. The passage-way is closed at the bottom by the ground, with which the side walls closely engage and from which they are supported by posts. Between the inclined upper edges of the side walls is stretched a netting $b^2$, preferably of wire, which extends from the edge of the roof $a^3$ to approximately the centers of the projecting portions $a^4$, to the inner surfaces of which it is secured. A vertical netting $b^3$, secured at its bottom to a cross-bar E and at its sides to the side walls $a'$ $a^2$, extends upwardly and terminates in close proximity to the upper edge of the netting $b^2$, forming in conjunction therewith a contracted passage-way $b$. The netting $b'$ extends around the projecting side portions $a^4$, being attached to the edges thereof, and at its lower end engaging the surface of the netting $b^2$. The netting $b'$ projects horizontally inward terminating in close contact with the vertical netting $b^3$. The portions of netting $b'$ $b^2$ $b^3$ form the fly-trap B, extending entirely across the passage-way A, and comprising converging guideways to direct the flies to the entrance $b$.

Secured to and depending from the cross-bar E are a series of strips C, arranged close together and forming a curtain or screen extending completely across the passage-way A and immediately below the opening $b$ of the fly-trap B. These strips C are attached to the bar E, so as to permit them to swing and be pushed aside without detaching them. They may comprise switches, pieces of brush, cane, or strips of leather.

A series of horizontal slats D extend outwardly from the rear end of the passage-way A, forming two exits, which, while permitting the cattle to pass out owing to the flexibility or resiliency of the material of which they are made, prevent the entrance of the cattle by reason of the close proximity of the opposing ends forming the respective exits.

The operation of my invention is as follows: The cattle or other animals pass through the entrance $a$ into the passage-way and through the same to the curtain or brush C. The instant the animal starts through the brush all the flies will immediately leave it to avoid being brushed off. The animal passes on through the brush and out of one of the exits free from flies. The flies upon leaving the animal at once seek the strongest light, according to their well-known habit. The entrance to the closed passage-way A being located in an offset portion out of alinement with the passage-way, the light therefrom is much less than that passing through the netting above the brush, especially as the opening caused by such netting is larger than the area of the entrance. The flies will thereupon fly against the netting $b^2$ or $b^3$ and be guided thereby to the opening $b$, through which they will pass into the trap B.

It is customary for animals when bothered by flies to rub through brushes and then run off, so as to escape before the flies which have been frightened or brushed off can again light upon them. Domestic animals will therefore readily take advantage of a device constructed according to my invention, especially after having been shown its utility by being driven through it a few times, after which they will pass through of their own accord.

Careful experiment and observation have disclosed the fact that while flies will stick to animals while they pass through a darkened passage-way of some length, they will at once fly off when the animal starts through brush or a small opening, only to again alight on the animal as soon as the brush or opening has been passed through. The flies will therefore remain on the animals while they pass through the passage-way until brushed or frightened off by the screen C as the animal passes therethrough.

Having fully described my invention, what I claim, and desire to secure by Letters Patent, is—

1. In an apparatus for relieving animals of flies, the combination of a darkened or opaque passage-way; a fly-frightening device intercepting the same; and a translucent fly-trap communicating with the passage-way adjacent to said frightening device, substantially as and for the purpose described.

2. In an apparatus for relieving animals of flies, the combination of an elongated closed passage-way having a lateral entrance-opening for the animals; a fly-frightening device extending across said passage-way at a point remote from said entrance-opening; and a translucent fly-trap communicating with the passage-way adjacent to said frightening device.

3. In an apparatus for relieving animals of flies, the combination of a closed passage-way having an entrance-opening at one end; a one-way-opening exit device at the other end; and a penetrable fly-frightening device extending across the passage-way adjacent to said exit.

4. In an apparatus for relieving animals of flies, the combination of a closed passage-way having an entrance-opening at one end for the animals and a contracted exit at the opposite end with yielding sides; a penetrable fly-frightening device extending across the passage-way adjacent to said exit; and a fly-trap communicating with said passage-way adjacent to the fly-frightening device.

In testimony whereof I affix my signature in presence of two witnesses.

HARVEY CHENAULT.

Witnesses:
B. E. TURLEY,
J. STONE WALKER.